United States Patent [19]

Hashimoto

[11] Patent Number: 5,432,835
[45] Date of Patent: Jul. 11, 1995

[54] TELEPHONE DEVICE FOR AMPLIFYING OPPOSITE PARTY'S VOICE AFTER USER'S TELEPHONE IS PLACED ON-HOOK

[75] Inventor: Kazuo Hashimoto, Tokyo, Japan
[73] Assignee: Hashimoto Corporation, Tokyo, Japan
[21] Appl. No.: 128,025
[22] Filed: Sep. 29, 1993
[30] Foreign Application Priority Data
 Sep. 30, 1992 [JP] Japan .................. 4-283633
[51] Int. Cl.$^6$ .............................................. H04M 1/00
[52] U.S. Cl. ................................... 379/387; 379/377; 379/388; 379/379
[58] Field of Search ............... 379/377, 387, 388, 390, 379/386, 399, 379, 123

[56] References Cited

U.S. PATENT DOCUMENTS

| | | | |
|---|---|---|---|
| 4,317,964 | 3/1982 | Biggs et al. | 379/377 X |
| 4,477,698 | 10/1984 | Szlam et al. | 379/377 |
| 4,496,797 | 1/1985 | Price . | |
| 4,759,054 | 7/1988 | Mellon | 379/123 X |
| 4,847,896 | 7/1989 | Siligoni et al. | 379/377 X |
| 4,903,291 | 2/1990 | Tsurufuji et al. | 379/88 |
| 5,140,631 | 8/1992 | Stahl | 379/377 |

Primary Examiner—James L. Dwyer
Assistant Examiner—M. W. Shehata
Attorney, Agent, or Firm—Lowe, Price, LeBlanc & Becker

[57] ABSTRACT

This device is designed so that although voice of the opposite party will be amplified when telephone 1 on the side of the device is first placed on-hook during a telephone conversation, amplification will not occur if the opposite party places his or her phone on-hook first during a telephone conversation or if the user places telephone 1 on-hook before the opposite party picks up the telephone. The structure, which is shown in FIG. 1 such that during a telephone conversation between telephone 1 and telephone 12, when telephone 1 is placed on-hook first, the on-hook status is detected by means of the photocouplers PC-1 or PC-2, and the voice of the opposite party at telephone 12 is amplified by means of contacts y1-1 and y1-2, which are in the make position, line transformer 2, amplifier 3 and speaker 4. Further, when the opposite party's telephone 12 is placed on-hook first, the voice of the opposite party will not be amplified because a reversal of polarity and a brief disconnection on telephone line 13 are detected by means of photocouplers PC-1 and PC-2.

3 Claims, 4 Drawing Sheets

TELEPHONE DEVICE FOR AMPLIFYING OPPOSITE PARTY'S VOICE AFTER USER'S TELEPHONE IS PLACED ON-HOOK

BACKGROUND OF THE INVENTION

The present invention relates to a telephone device which allows a remote party's voice to be amplified after user's telephone is placed on-hook.

During a telephone conversation, if one party put the telephone on-hook before the conversation had concluded, it became necessary for the party to dial the other party's telephone number in order to resume the conversation.

SUMMARY OF THE INVENTION

The present invention proposes a means whereby it is possible to amplify the other side's voice if the telephone which is on the side of the invention is put on-hook first.

The present invention amplifies the other side's voice and enables the continuation of a conversation when the telephone on the side of the present invention is put on-hook first during the conversation, by using a means for detecting on-hook condition of the telephone on the side of the present invention; a means for detecting on-hook condition of the other side's telephone; and a voice amplification means.

[Legend]

1. Telephone set
2. Line transformer
3. Amplifier
4. Speaker
5. CPU
6. LED section of photocoupler PC-1
7. Phototransistor section of photocoupler PC-1
8. LED section of photocoupler PC-2
9. Phototransistor section of photocoupler PC-2
10. Resistor
11. Condenser
12. Telephone set
13. Telephone line

DESCRIPTION OF THE PREFERRED EMBODIMENT

Figure 1:
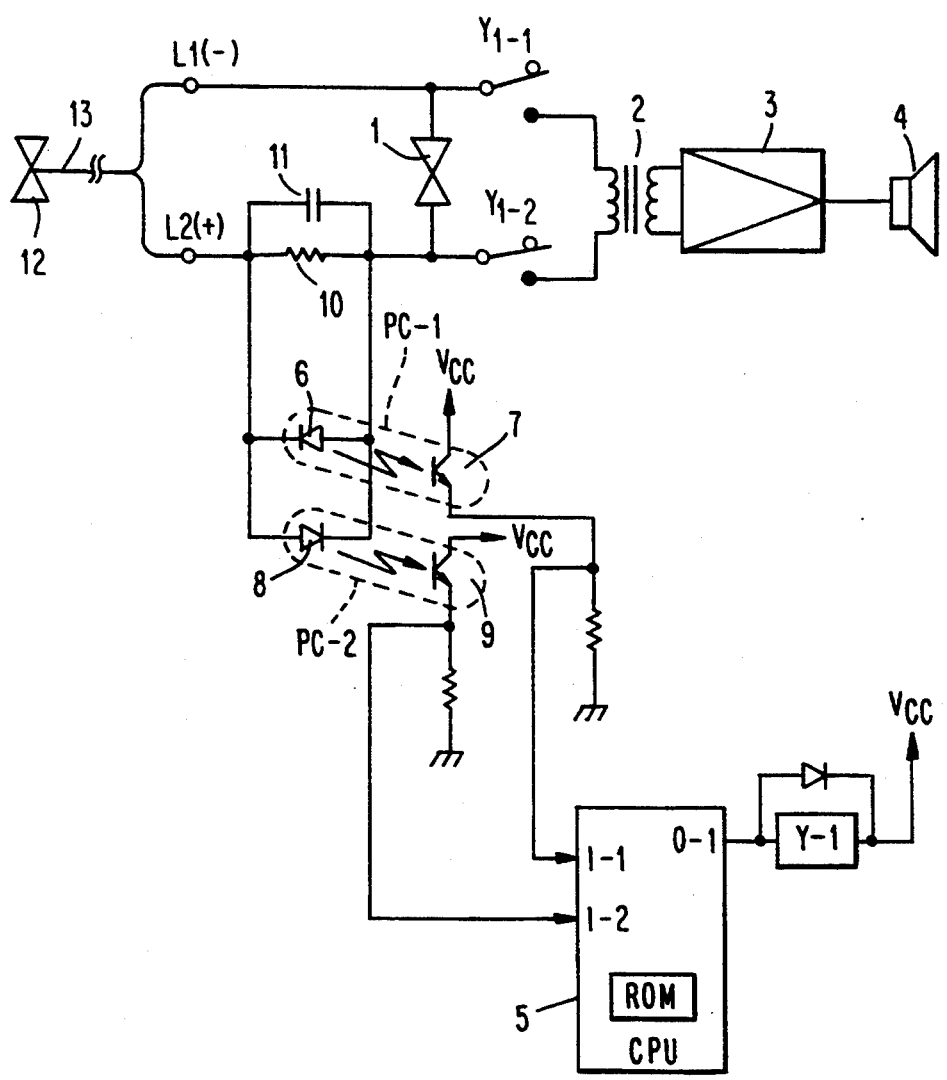
FIG. 1 is a block diagram of one embodiment of the present invention.

In FIG. 1, Number 1 is a telephone set. Number 2 is a line transformer which operatively connects the telephone line and the device of the present invention. Number 3 is an amplifier for amplifying sound signals of the telephone line. Number 4 is a speaker. Number 5 is a one-chip microprocessor which includes a ROM in which the program is stored, input ports I-1 and I-2, and output port O-1. Relay Y-1, which is a load on the above-mentioned output port O-1, has contacts y1-1 and y1-2.

Photocoupler PC-1 is comprised of LED 6 and photo-transistor 7. Likewise, PC-2, a similar photocoupler, is comprised of LED 8 and phototransistor 9. Number 10 is a shunt resistance. Number 11 is a bypass condenser for sound signals. Number 12 is an unspecified telephone set. Number 13 is a telephone line.

The various components listed above may be built into telephone set 1 or they may be in the form of an adapter. If a microprocessor is already built into telephone set 1, it may be possible to copy the program which is stored in the above-mentioned ROM into the microprocessor of the above telephone set 1.

Figure 2:
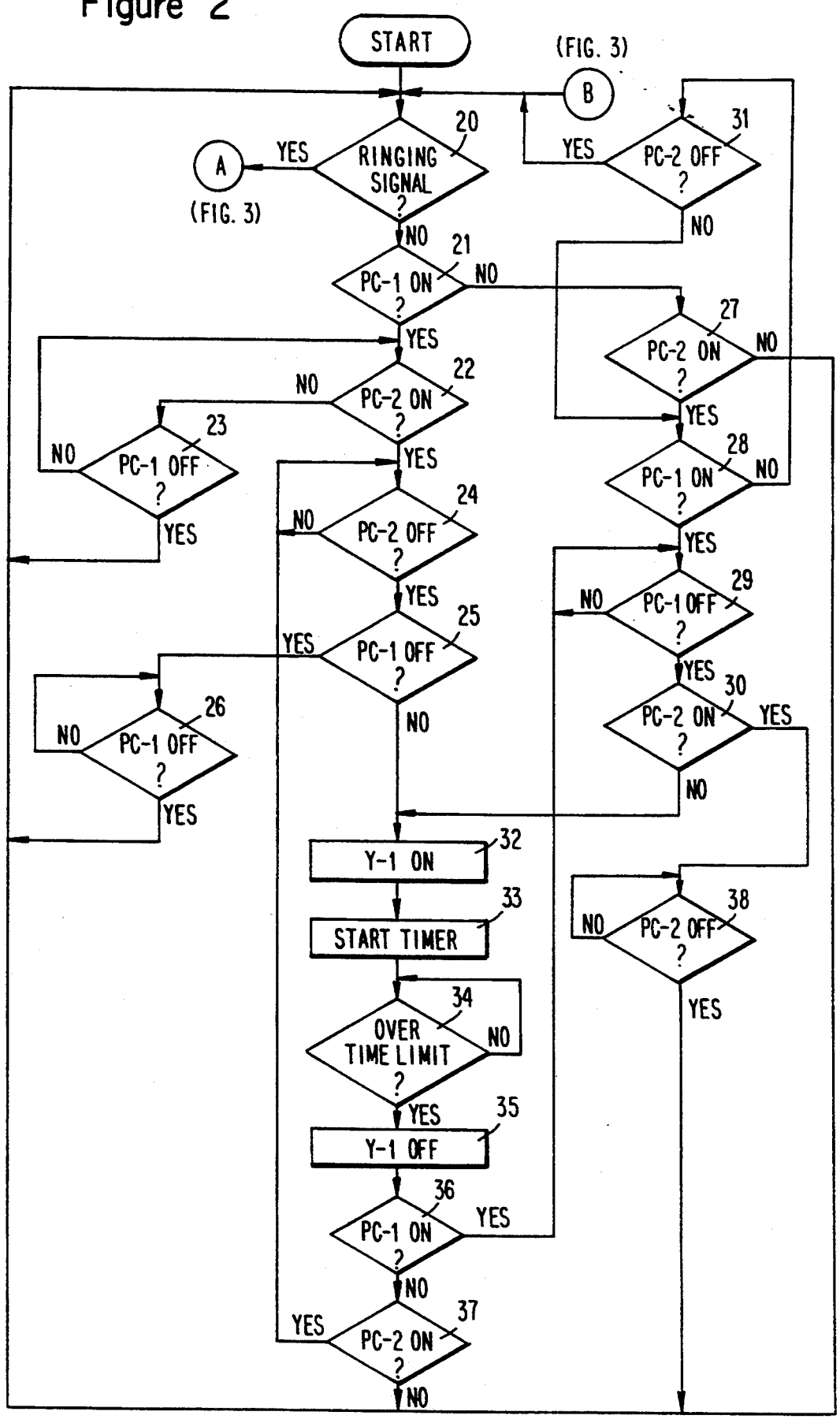
FIG. 2 is a flowchart showing operation of one embodiment of the present invention.
Figure 3:
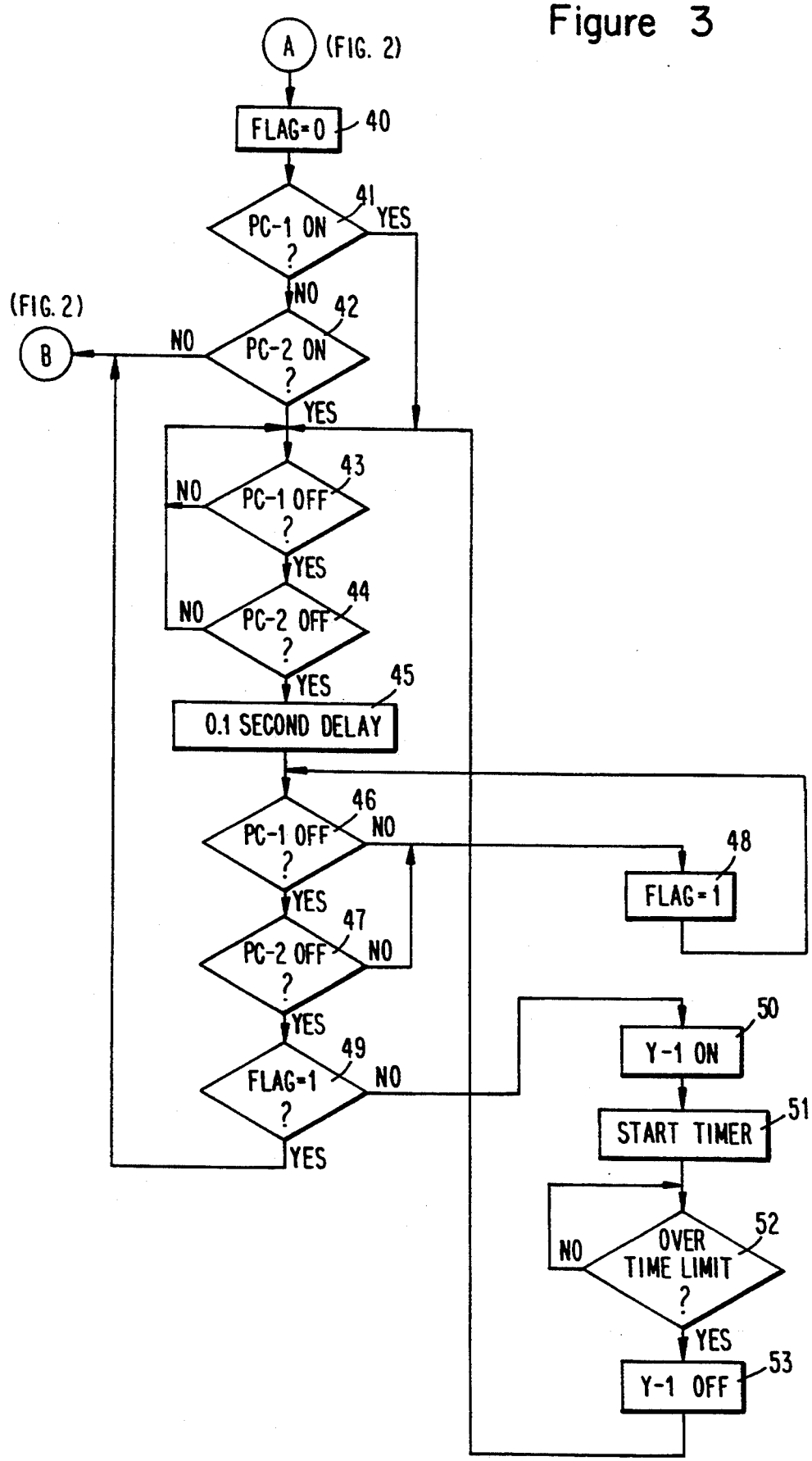
FIG. 3 is a flowchart showing operation of one embodiment of the present invention.

Next, the operation and use of the device will be described in detail with reference to the flowcharts of FIGS. 2 and 3.

1. Control of the Voice Amplification Means When Calling up Unspecified Telephone Set 12 from Telephone Set 1

In FIG. 1, terminal L1 of telephone line 13 is negative and terminal 752 is positive. When the handset (not shown) of telephone 1 which is on the side of the present device is taken off-hook, the current flows in the direction indicated by arrow 100 of FIG. 4. Therefore, LED 8 of photocoupler PC-2 will emit light, and in response to the light, phototransistor 9 will turn on. (Hereinafter, for simplicity's sake, this condition will be referred to as "PC-2 on." The analogous situation for PC-1 will be referred to as "PC-1 on.") Microprocessor 5 detects this "on" condition via input port 1-2. Photocoupler PC-1 remains off.

Next, explanation will be given with reference to the flowcharts of FIGS. 2 and 3. Since there is no incoming ringing signal at telephone 1, Step 20 will be negative. (The case in which there is an incoming ringing signal at telephone 1 will be discussed later.)

As stated above, taking telephone 1 off-hook results in PC-2 turning on (while PC-1 remains off). Therefore, Step 21 will be negative and Step 27 will be affirmative. Step 28 will be negative and so will Step 31, which causes the program to loop back to Step 28.

Figure 5:
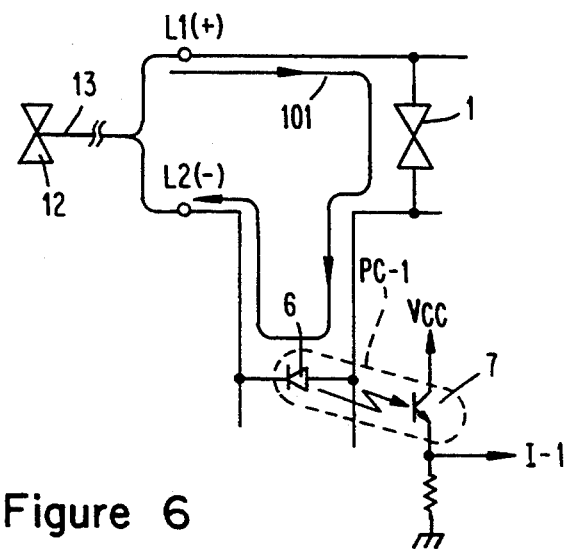
FIG. 5 is a diagram illustrating current flow in the telephone line loop.

While the caller at telephone 1 is dialing telephone 12's telephone number, the program runs in a loop between Step 28 and Step 31. When telephone 12 is taken off-hook in response to the ringing signal, the polarity of telephone line 13 becomes reversed, as shown in FIG. 5, with L1 becoming positive and L2 becoming negative. As a result of this polarity change, the current begins to flow in the direction indicated by the arrow 101. Then, PC-2 turns off and PC-1 turns on. When PC-1 turns on, Step 28 will be affirmative and the program will exit the loop formed by Step 28 and Step 31.

Figure 4:
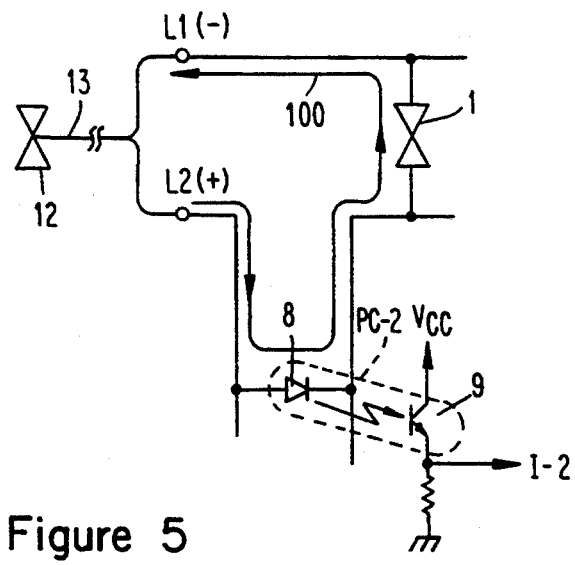
FIG. 4 is a diagram illustrating current flow in the telephone line loop.

The program advances to Step 29 where a test takes place to determine whether PC-1 is off. Assuming that the called party's telephone 12 is placed on-hook first, the polarities of L1 and L2 will return to negative and positive, respectively, as shown in FIG. 4. This causes PC-1 to turn off and PC-2 to turn on. Then, Step 29 becomes affirmative.

In Step 30, a test is performed to determine whether PC-2 is on. If, as described above, telephone 12 is placed on-hook while telephone 1 is still off-hook, Step 30 will be affirmative. Next, in Step 38 a test is performed to determine whether PC-2 is off. This is the equivalent of testing whether telephone 1 has been placed on-hook. If telephone 1 has been placed on-hook after telephone 12, Step 38 will be affirmative and the program will return to standby mode at Step 20, which is the first step of the program.

When, as described above, the called party's telephone set 12 is placed on-hook first, a tone similar to a busy signal (or, in the U.S., a dial tone) will be sent from the telephone exchange to the caller. As there is no need to amplify this tone, the present device is designed so that the amplification feature will not be activated in this situation.

Figure 6:
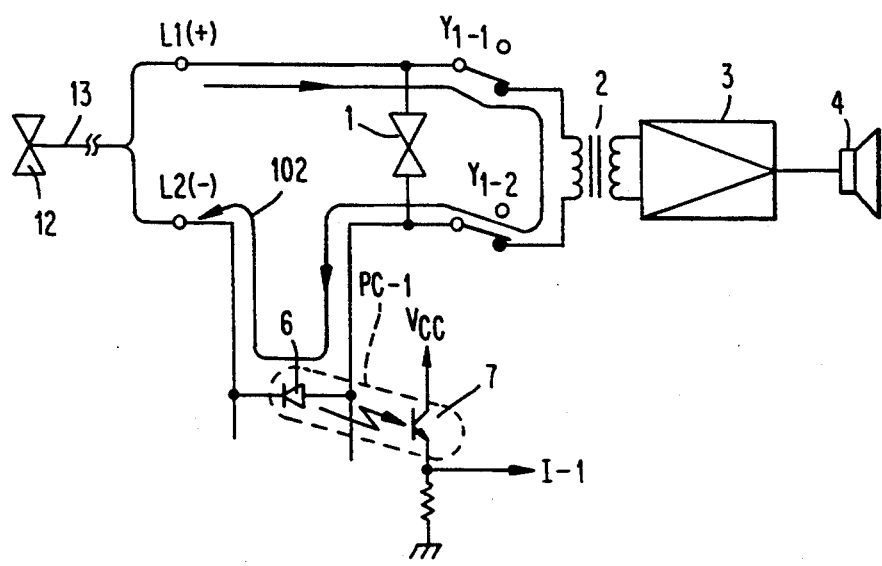
FIG. 6 is a diagram illustrating connections during voice amplification mode.

On the other hand, if the caller's telephone set 1 is placed on-hook first, PC-1 and PC-2 turn off momentarily and, during this brief period of time, Step 29 will be affirmative and Step 30 will be negative. Next, in Step 32, relay Y-1 is turned on and maintained in that position by Steps 33 and 34. As shown by the arrow 102 in FIG. 6, the engagement of telephone line 13 is continuously maintained by the loop formed by contact y1-1, line transformer 2, contact y1-2, and LED 6, rather than telephone 1 by itself. Photocoupler PC-1 turns on again and PC-2 stays off. As long as the sound signals from telephone 12 continue, the above sound signals will be picked up via line transformer 2 and amplified by means of amplifier 3 and speaker 4.

At the beginning of amplification, a timer, which could be, for example, a four second timer, is started. When the four seconds have elapsed, relay Y-1 is switched off, causing the amplification to be turned off (Steps 34 and 35). If telephone 1 is taken off-hook during the amplification period, PC-1 will remain on, even after relay Y-1 is turned off at Step 35, because telephone 1 will be maintaining the DC loop condition. Next, since PC-1 is on, Step 36 will be affirmative. The program then returns to the above Step 29 where the above amplification operation may be repeated if desired.

If telephone 1 is left on-hook for longer than the amplification period, PC-1 and PC-2 will turn off, and the device will return to standby mode at Step 20 after passing through Step 36 and Step 37.

With regard to Step 28, note that if the called party had responded, PC-1 will have turned on and Step 28 will be affirmative. In this situation, amplification will take place. However, if the called party does not respond and the caller puts telephone 1 on-hook, PC-2 will turn off and Step 31 will be affirmative. This causes the program to return to standby mode at Step 20, thereby amplification does not take place.

Placing telephone 1 on-hook before completion of dialing or placing it on-hook before telephone 12 responds, both result in the program forming a loop between the above-mentioned Steps 28 and 31. Thus, the dial tone and the ringback tones transmitted from the telephone exchange will not be amplified.

Steps 21 through 26 illustrate operations which would take place if the telephone line had been wired with polarity opposite from that of the above example, that is, when terminal L1 is positive and terminal L2 is negative. Since operations in both cases are similar, a detailed description will be omitted.

2. Control of the Voice Amplification Operations when Telephone 1 Receives an Incoming Call from Unspecified Telephone 12

When the present device receives a call from unspecified telephone 12, the AC portion of the ringing signal is detected by the program via photocouplers PC-1 and PC-2. Thus, when the ringing signal comes in, Step 20 becomes affirmative and the program advances to Step 40 of FIG. 3 where "FLAG" is initialized to "0."

When telephone 1 is taken off-hook in response to the above ringing signal, a DC loop, for example, as indicated by arrow 100 in FIG. 4 is formed according to the polarity of telephone line 13. This DC loop causes PC-2 to turn on. Thus, Step 42 will be affirmative after the program passes through Step 41. Next, by means of the loop formed by Steps 43 and 44, a test is performed to determine whether PC-2 is off, or, in other words, whether telephone 12 or telephone 1 is on-hook. This detects the completion of the conversation.

When telephone 12 on the side of the caller is placed on-hook first, the resultant switching of the relay (not shown) of the telephone exchange (not shown) causes the voltage of telephone line 13 to drop momentarily (approximately 20 milliseconds) to zero volts. This causes PC-2 to turn off momentarily (note that as telephone 1 is still off-hook, PC-2 will turn on again).

It is a matter of course that PC-2 turns off when telephone 1 is placed on-hook. Therefore, Step 43 and Step 44 become affirmative. Step 45 provides a delay of approximately 0.1 seconds. In Steps 46 and 47, testing will take place again to determine whether PC-1 and PC-2 are off.

Even though PC-2 is turned off momentarily as a result of placing telephone 12 on-hook first as shown above, as long as telephone 1 is off-hook, PC-2 will return to the "on" condition (this corresponds to PC-2 in the example shown in FIG. 4) after the delay of 0.1 seconds at Step 45.

Next, if PC-1 is on, Step 46 will be negative, or if PC-2 is on, Step 47 will be negative. Either case will result in "FLAG" being set to "1" at Step 48 before the program returns to Step 46. A value of "1" for "FLAG" serves to keep track of the fact that telephone 12 on the caller's side was placed on-hook first.

When telephone set 1 on the called party's side is placed on-hook after telephone 12 had already been placed on-hook, as is obvious from the above description, PC-1 will turn off (PC-2 has already been turned off), resulting in Steps 46 and 47 becoming affirmative. Since the aforementioned "FLAG" had been set to "1," Step 49 is affirmative, and the program returns to standby mode at Step 20.

Therefore, when the caller has placed his or her own telephone 12 on-hook first, even if the signal on telephone line 13 were amplified at the side of telephone 1, it is not as if the caller's voice would be heard. All that would be heard is a tone similar to a busy signal (in Japan, but, in the United States, a dial tone). Therefore, this invention has been constructed so that the aforementioned voice amplification feature will not operate if telephone 12 had been placed on-hook first.

On the other hand, if the called party's telephone 1 is placed on-hook first, since PC-1 and PC-2 remain off even after the aforementioned 0.1 second delay of Step 45, both Steps 46 and Step 47 are affirmative.

As is obvious from the above description, Step 49 will be negative because "FLAG" has been initialized to "0." In Steps 50 through 53 (which have the same operation as Steps 32 through 35), the aforementioned voice amplification feature will be activated. When the called party places his or her telephone 1 on-hook while the caller is still talking, the caller's voice can still be heard because it will be amplified by the aforementioned voice amplification feature. The called party may resume the conversation by taking telephone 1 off-hook again.

It should be noted that in this embodiment, voice amplification takes place for several seconds by using a timer. However, it is also possible to have a construction such that even though a timer is not used, voice amplification takes place while telephone 12 is off-hook or, in other words, until the placement of telephone 12 on-hook is detected.

Furthermore, by providing another photocoupler in series with telephone 1 or by some similar means, it is also possible to deactivate the voice amplification feature when telephone 1 is taken off-hook.

In this invention, as shown above, when telephone 1, which is on the side of the present device, is placed on-hook first during a telephone conversation, it is possible to amplify the voice of the party at telephone 12. Therefore, if the conversation is not yet concluded, it is possible to resume the conversation by taking telephone 1 off-hook. However, the invention is constructed so that when telephone 12 is placed on-hook first, the voice amplification means will not be activated. Thus, a tone, such as busy tone (dial tone in the U.S.), which can be heard after disconnection will not be amplified. Moreover, when originating a call from telephone 1, if telephone 1 is placed on-hook before the called party takes telephone 12 off-hook because the caller decides not to complete the dialing or because no one answers, the voice amplification means will not operate. Therefore, there will be no unnecessary amplification of dial tones or ringback tones.

What is claimed is:

1. A telephone device for amplifying an opposite party's voice after user's telephone is placed on-hook, said telephone device comprising:
   ringing signal detection means for detecting a ringing signal from an unspecified second telephone;
   off-hook detection means for detecting off-hook condition of a first telephone after said ringing signal is detected by said ringing signal detection means;
   first on-hook detection means for detecting on-hook condition of said first telephone after said first telephone is placed off-hook;
   second on-hook detection means for detecting on-hook condition of said second telephone; and
   voice amplification means for amplifying sound signals on telephone line,
   wherein depending on output of said first on-hook detection means and said second on-hook detection means, said voice amplification means operates when said first telephone is placed on-hook first but does not operate when said second telephone is placed on-hook first.

2. A telephone device for amplifying an opposite party's voice after user's telephone is placed on-hook, said telephone device comprising:
   a first telephone for calling an unspecified second telephone;
   first off-hook detection means for detecting off-hook condition of said first telephone;
   first on-hook detection means for detecting on-hook condition of said first telephone;
   second on-hook detection means for detecting on-hook condition of said second telephone; and
   voice amplification means for amplifying sound signals on telephone line,
   wherein depending on output of said first on-hook detection means and said second on-hook detection means, said voice amplification means operates when said first telephone is placed on-hook first but does not operate when said second telephone is placed on-hook first.

3. A telephone device for amplifying an opposite party's voice after user's telephone is placed on-hook as set forth in claim 2, wherein said voice amplification means does not operate if said first telephone is placed on-hook while said second telephone is not placed off-hook yet in spite of said first telephone's attempt to call said second telephone.

* * * * *